(12) United States Patent
Pastrana

(10) Patent No.: US 10,951,610 B2
(45) Date of Patent: *Mar. 16, 2021

(54) OPERATION OF MATHEMATICAL CONSTANT PI TO AUTHENTICATE WEBSITE AND COMPUTER NETWORK USERS

(71) Applicant: Joseph Carlo Pastrana, Hampton, VA (US)

(72) Inventor: Joseph Carlo Pastrana, Hampton, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/011,882

(22) Filed: Sep. 3, 2020

(65) Prior Publication Data
US 2021/0044581 A1 Feb. 11, 2021

Related U.S. Application Data

(63) Continuation-in-part of application No. 16/741,996, filed on Jan. 14, 2020.

(51) Int. Cl.
*G06Q 40/00* (2012.01)
*H04L 29/06* (2006.01)
(Continued)

(52) U.S. Cl.
CPC ............ *H04L 63/0846* (2013.01); *G06F 8/61* (2013.01); *G06F 17/10* (2013.01); *H04L 9/3213* (2013.01)

(58) Field of Classification Search
CPC ..... H04L 63/0846; H04L 9/3213; G06F 8/61; G06F 17/10
See application file for complete search history.

(56) References Cited

U.S. PATENT DOCUMENTS

| | | | |
|---|---|---|---|
| 7,427,033 B1 * | 9/2008 | Roskind | G06F 21/34 235/380 |
| 10,078,840 B2 * | 9/2018 | Powell | G06Q 20/3821 |

(Continued)

FOREIGN PATENT DOCUMENTS

| | | | | |
|---|---|---|---|---|
| EP | 3168803 A1 * | 5/2017 | ......... | G06Q 20/3829 |
| WO | WO-2015126753 A1 * | 8/2015 | ........... | G06Q 20/363 |
| WO | WO-2018112525 A1 * | 6/2018 | ............. | G06Q 20/18 |

OTHER PUBLICATIONS

Ms. Smith, "Can credit cards with CVVs that automatically change every hour kill off card fraud?," Privacy and Security Fanatic, News (Year: 2016).*

(Continued)

*Primary Examiner* — Alexander G Kalinowski
*Assistant Examiner* — William B. Bunker

(57) ABSTRACT

A computer-implemented user authentication method to provide users of computer devices interconnecting with computer information systems with a frequently changing numeric passcode generated via a time-synchronized mathematical operation of the mathematical constant Pi (π) without the need for a Two Factor Authentication process. The method operates the mathematical constant Pi, wherein an application software performs the mathematical operation of Pi to select a segment of Pi. The selected Pi segment becomes the user's passcode, referred in this invention as the PI ID Value (PIV). The method is dynamic, creating a new PIV for the computer user each time the user operates his/her computer device to gain access into a network or website. To attain the same Pi segment in real-time and authenticate the user, the network or website administrator utilizes in its computer server the same parameters and mathematical operation used by the user's computing device.

27 Claims, 3 Drawing Sheets

(51) Int. Cl.
*G06F 17/10* (2006.01)
*H04L 9/32* (2006.01)
*G06F 8/61* (2018.01)

(56) References Cited

U.S. PATENT DOCUMENTS

| | | | | |
|---|---|---|---|---|
| 10,375,120 | B2* | 8/2019 | Baumgart | G06N 20/10 |
| 2010/0293093 | A1* | 11/2010 | Karpenko | G06Q 20/40 |
| | | | | 705/41 |
| 2012/0018506 | A1* | 1/2012 | Hammad | G06Q 30/06 |
| | | | | 235/375 |
| 2012/0153028 | A1* | 6/2012 | Poznansky | G07F 7/122 |
| | | | | 235/492 |
| 2013/0008956 | A1* | 1/2013 | Ashfield | G06Q 20/24 |
| | | | | 235/380 |
| 2013/0124292 | A1* | 5/2013 | Juthani | H04L 63/083 |
| | | | | 705/14.26 |
| 2015/0120571 | A1* | 4/2015 | Sanchez | G06Q 20/4012 |
| | | | | 705/72 |
| 2016/0027017 | A1* | 1/2016 | Chitragar | G06Q 20/202 |
| | | | | 705/71 |
| 2016/0247141 | A1* | 8/2016 | Graylin | G06Q 20/40145 |
| 2016/0275513 | A1* | 9/2016 | Kumar | G06Q 20/36 |
| 2018/0373861 | A1* | 12/2018 | Pastrana | G06F 21/40 |
| 2019/0303915 | A1* | 10/2019 | Hammad | G06F 21/34 |
| 2019/0354985 | A1* | 11/2019 | Edwards | G06Q 20/4018 |

OTHER PUBLICATIONS

Barri Segal, "Will dynamic CVVs become the ultimate in credit card security?" Creditcards.com/credit-card-news, (Year: 2017).*
Anonymous, "Understanding and Selecting a Tokenization Solution," Securosis, (Year: 2018).*
Blog, "Is pi a good random number generator?" Mathoverflow, mathoverflow.com/net/questions (Year: 2010).*

* cited by examiner

Fig. 1

PIV METHOD SEQUENCE

| |
|---|
| STEP 1. The user visits a Network (or Website) and uploads into his/her computing device (e.g. cell phone) the software application needed to perform the mathematical operation of Pi ($\pi$). The Network (or Website) develops and allows users to upload the software application that supports the Pi-Based User Authentication Method (PAM); |
| STEP 2. The user selects and uploads a section of Pi into his/her computing device from the Network or Website (Pi is stored at the network computer server or website computer server), wherein the array of digits comprising the section of Pi selected by the user becomes his/her assigned Pi Range (PR); |
| STEP 3. The user uploads in his/her computing device the Pi User Identifiable Parameters (PUIPs) and the user's Personal Identifiable Information (PII) to create his/her account and to provide the PUIPs' numeric values needed to calculate PIVs; |
| STEP 4. The user transmits from his/her computing device the now created PUIPs and PII to the Network's computer server (or Website's computer server). The transmission of the PUIPs and PII will allow the Network's computer server (or Website's computer server) to calculate and arrive at the same Pi Segment (PS = Passcode = PIV) calculated by the user's computing device and hence, be capable to authenticate the user during the login/user authentication process; |
| STEP 5. The user logs out from the Network (or Website). As a result of steps 1 - 4, the User's computing device and the computer server of the Network (or Website) are now synchronized and capable to calculate the passcode (PIV) in real time; |
| STEP 6. The user visits the Network (or Website) and initiates the login process. The user generates a passcode through his/her computing device as he/she needs the passcode to log into a Network (or Website); |
| STEP 7. The user transmits the generated passcode (PIV) to the Network's computer server or Website's computer server; |
| STEP 8. After receiving the user's passcode (PIV), to authenticate the User's generated passcode, the Network's computer server or the Website's computer server generates its own passcode utilizing the user's PUIPs; |
| STEP 9. The Network's computer server (or Website's computer server) generated passcode is compared to the user's generated passcode, if the two passcodes (generated during login process) are a match, then the user is authenticated and authorized to enter into the Network/Website's secured information systems. |

OPERATION OF MATHEMATICAL CONSTANT PI TO AUTHENTICATE WEBSITE AND COMPUTER NETWORK USERS

CROSS-REFERENCE TO RELATED APPLICATIONS

U.S. Utility patent application Ser. No. 16,741,996

FEDERALLY SPONSORED RESEARCH OR DEVELOPMENT

Not applicable to this application

SEQUENCE LISTING, A TABLE, OR A COMPUTER PROGRAM LISTING

Not applicable to this application

COMPACT DISC APPENDIX

Not applicable to this application

STATEMENT REGARDING PRIOR DISCLOSURES BY THE INVENTOR

Not applicable to this application

BACKGROUND OF THE INVENTION

The technical field of the invention relates to the security of computerized information systems. More particularly, the present invention relates to the field of computer networks and websites' security and user authentication when the user of a computing device is logging into a secured computerized information system. When a user is initiating an interface with a secured computerized information system, whether a network or a website, entering personal identifying information, or some other form of login data, an authentication of the login data is almost always required. When a person registers and obtains personal identifying information (e.g. User ID, Password, etc.) to log into a secured network or website, the network or website administrator is constantly trying to safeguard his/her information system and database. The effort is endless and always required. For example, login methods, such as the method of a user simply inputting a username and password, which is verified by the administrator's server, or methods of login involving a one-time passcode key system (e.g. Two Factor Authentication (2FA)), where a one-time passcode is provided to the user by the administrator via email or electronic text (via cellphone), are used for user authentication by the administrator and thus, to authorize user access to a secured computer-driven information system.

These and other are methods still unable to avoid security problems, especially when an unauthorized person obtains an authorized user's login information to obtain illicitly access into a secured computer-driven information system. Moreover, disruptions in network connectivity and other communications problems renders the 2FA unable to provide constant timely login capabilities to computer users. Accordingly, improved systems and methods for user login authentication and access to secured data remain highly desirable.

BRIEF SUMMARY OF THE INVENTION

A computer-implemented authentication method to calculate and generate constantly changing identification constructs (passcodes) for users, computer networks and websites. These passcodes to authenticate the users of said websites and computer networks are generated via the operation of the mathematical constant Pi. The computer-run mathematical operation of the mathematical constant Pi ($\pi$) is a time-synchronized process between interfacing computer systems and designed to arrive at the same segment of Pi, becoming a one-time identification construct (passcode) assigned to the user. Thus, in this invention, the said identification construct (arrived from the selected Pi segment) is referred and becomes the User PI ID Value (PIV). The method is dynamic, creating a new PIV for the user each time the user operates his/her computer device to interface with a network or a website. As a note, on January 2020, the first 50 Trillion Digits of Pi were calculated and revealed.

The said computer device (also referred as computing device) includes such computer devices as laptops, tablets, iPads, or cellular telephones. The user's computer device is connected to a network and the network that communicates with the user's device is connected the World Wide Web or internet. Thus, the user's computing device is capable to communicate with a plurality of websites and other networks. The method is computer coded and operated by a computer application program designed to operate the said computer-implemented method. To authenticate a user, the administrator of a website or network utilizes in its computer server the same parameters, data and mathematical operation that the user utilizes on his/her computing device. By sharing the same parameters, data, time constraints and mathematical operation, the user's computing device and the administrator's server are both time-synchronized and capable to continually attain the same Pi Segments (PSs) within a prearranged time range. Thus, a PI Segment becomes the current and active User PI ID Value (PIV) to be utilized by the user to authenticate himself/herself.

The authentication of the PIV and hence the user, occurs when the user is utilizing his/her computing device to communicate with a website or network for the purpose of gaining access to said network or website (when the user's computing device sends the PIV information to the network or website to be authenticated by the said network and website). To authenticate the user, the network or website server calculates the user's PIV during the login process (limited to a specific time range) and if both calculated PIVs (passcodes) are a match, then the user's computing device is allowed to gain access to the secured network or website. Thus, the method provides the network or website with a real-time and time-synchronized process to verify the user's identity during the login process.

For added security, the method can require the user to select a subset of digits within the arrived Pi Segment to be utilized as the actual user's PIV. The added step provides an additional layer of security to the networks and websites. For example, if the method is programmed to select a 10 digit long segment from the Pi Range to be used as a "Pre" Pi Segment, and the method then requires the user to select a prearranged 6-digit subset of the digits comprising the Pre Pi Segment (e.g. the $3^{rd}$ to the $8^{th}$ digit being set as the user's PIV) then an unauthorized user who does not know which 6 digits to select as the PIV will not be able to login into the secured network or website. This feature is flexible, creating millions of possible combinations to construct a complete PIV.

For the reason that the method provides to the user with a different PIV each time he/she logs into each particular website or network, the user's historical PIV data is also utilized as Digitally Signed Tokens (also known as "tokens"). These tokens are stored in an encrypted format into the user' device, website and network databases to add another security layer to this method (the invention).

BRIEF DESCRIPTION OF THE SEVERAL VIEWS OF THE DRAWINGS

The following figures (FIG. 1, FIG. 2, and FIG. 3) are included to illustrate certain aspects of the invention, and should not be viewed as exclusive embodiments. The subject matter disclosed is capable of considerable modification, alteration, and equivalents in form and function, as will occur to one having ordinary skill in the art and the benefit of this disclosure.

FIG. 1 (Sheet 1 of 3) is depicting an operation sequence according to the user interface with his/her computer device as the user creates the Pi User Identifiable Parameters (PUIPs) and proceeds to acquire a new Pi Segment (PS) as the latest PIV to be assigned to him/her.

DETAILED DESCRIPTION OF THE INVENTION

Figure 2:
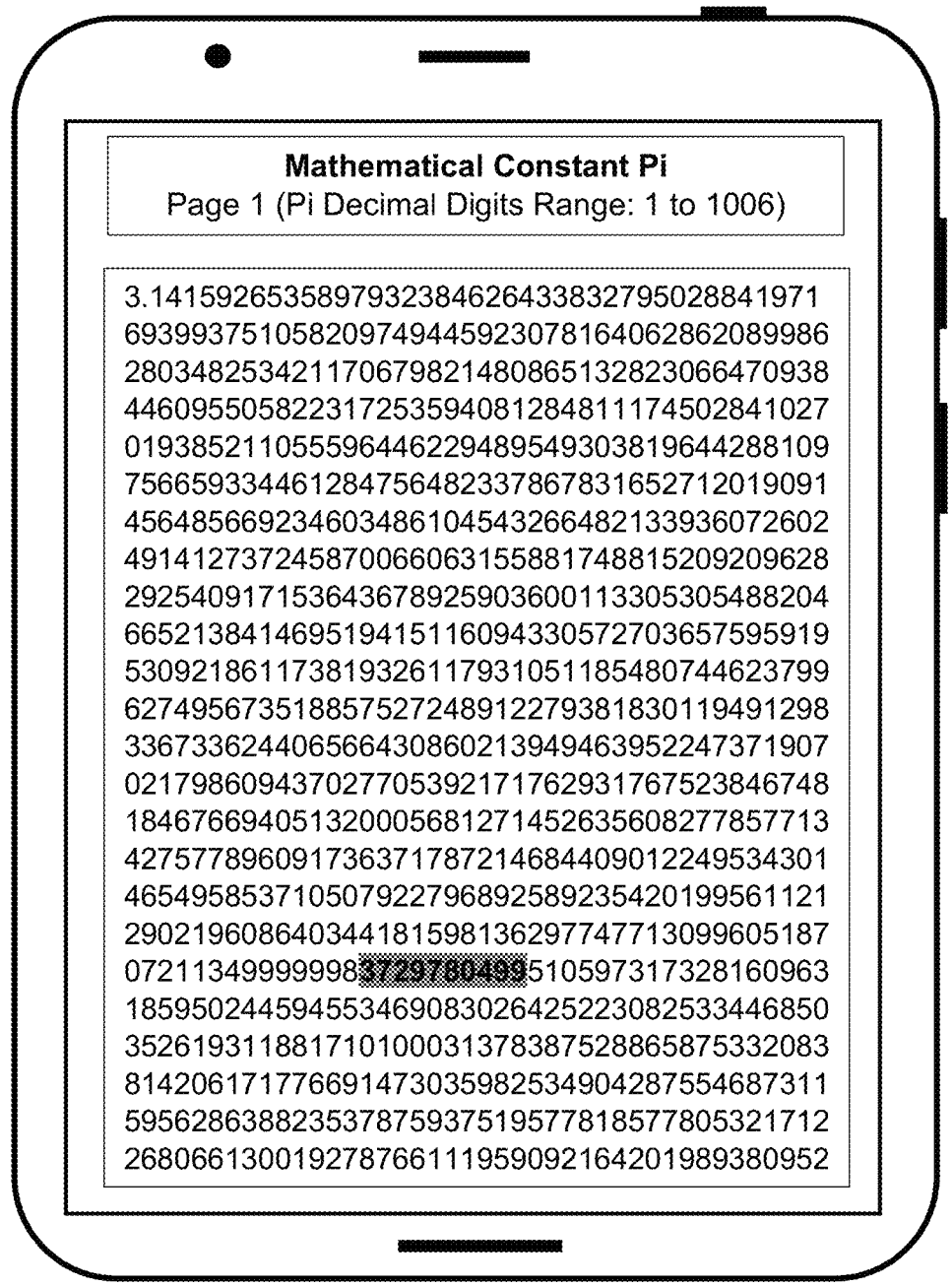
FIG. 2 (Sheet 2 of 3) depicts a cell phone's screen displaying the first 1,006 decimal digits of the Pi number and the highlighted Pi Segment "3729780499". As part of the user's parameters set up, the user must select his/her first Pi Segment as his/her Pi Starting Segment (PSS). Accordingly, the highlighted segment of Pi in FIG. 2 represents the PSS selected by the user. The highlighted Pi Segment "3729780499" is located in Page 1 (displayed by the cell phone's screen) of the numbered pages representing the Pi Range (PR) selected by the user (the number of pages created and displayed by the computing device will depend on the extent of the PR and the number (quantity) of decimal digits displayed per page).

The following description of the embodiment of the invention is not intended to limit the invention, but rather to enable any person skilled in the art to make and use this invention. Accordingly, the following description of the invention is provided. In simple terms, the method provides users, websites and computer networks with a frequently changing numeric passcode generated via a time-synchronized mathematical operation of the mathematical constant Pi ($\pi$) without the need for a Two Factor Authentication process. The said passcode is a one-time identification construct assigned to the user.

The method operates the mathematical constant Pi, wherein an application software performs the mathematical operation of Pi to select a segment of Pi. The selected Pi segment becomes the user's passcode, referred in this invention as the PI ID Value (PIV). The method is dynamic, creating a new PIV for the computer user each time the user operates his/her computer device to gain access into a computer network or website. To attain the same Pi segment in real-time and authenticate the user, the network server or website server utilizes the same parameters and mathematical operation used by the user's computing device. Thus, a computer synchronized authentication process to provide, in real-time, a passcode to users, computer networks and websites.

For simplicity purposes, in this patent application, the term "User" is used to define a user of a computing device who interfaces with networks and websites. The term "Administrator" is used to define the person who manages the network computer server connected to a network(s) or administer a website(s).

The term "Pi Range" represents a user's selected sequential array of decimal digits representing a subdivision of the mathematical constant Pi to be utilized by the said computer-implemented method (the invention). The extent of the Pi Range is defined and limited by the user and/or the administrator. For example, the user can select any sequential array of 100,000 decimal digits within Pi to comprise the Pi Range utilized by his/her computer device to calculate the Pi Segment (also referred as the Pi Identification Value (PIV)).

The user's created Pi Range is also provided to the administrator as the administrator's computer server necessitates it to calculate the PIV. To designate a section of Pi as his/her Pi Range, the user selects any point (digit) within the mathematical constant Pi as the beginning of his/her Pi Range. For example, the user can define his/her Pi Range (PR) as the range that begins with the thirteen decimal digit of Pi. Thus, the numeral "7" in the 3.1412956535897932 array of decimal digits of Pi is the first digit in his/her assigned 100,000 decimal digits Pi Range. Or, the user simply selects the first 100,000 decimal places of Pi to constitute the PR agreed upon by the user and the administrator. Thus, the first ten decimal digits of the PR are "1412956535" and the PR will continue for another 99,990 decimal digits. The method allows users to select their own PR. Further, the PR (stored at the user's computing device as well as the website's server and network's server) can be encrypted to provide an additional security layer to users, networks and websites.

Figure 3:
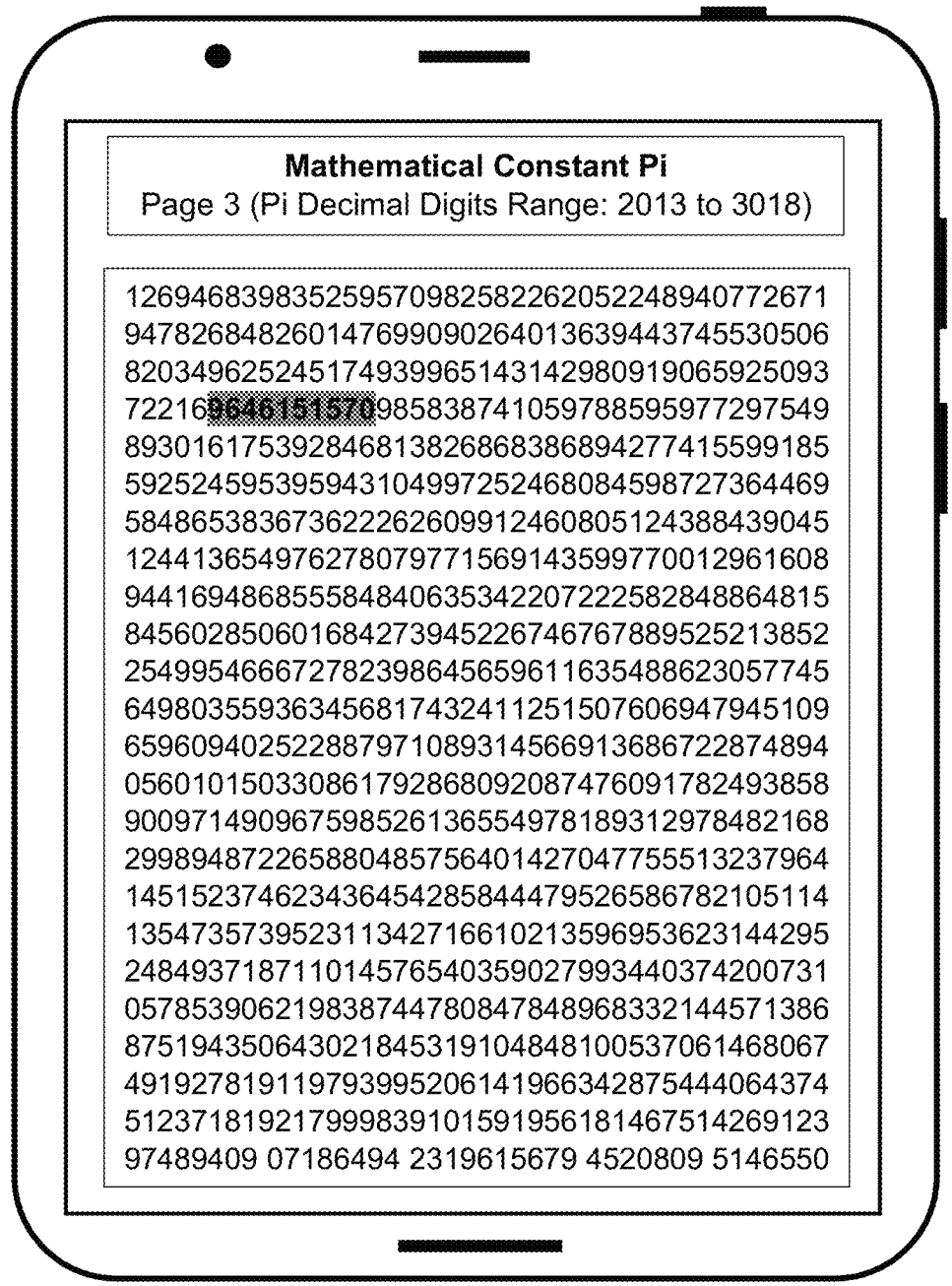
FIG. 3 (Sheet 3 of 3) depicts a cell phone's screen displaying a section of the Pi Range (page 3) starting on the 2,013 tenths decimal digit and ending on the 3,018 tenths decimal digit. The highlighted Pi Segment (PS) "9646151570" represents the latest calculated Pi Identification Value (PIV) assigned to the user.

The term "Pi Segment" (PS) represents a sector within the Pi Range. Thus, a Pi Segment (PS) is a section of a Pi Range (PR) and a Pi Range is a section of Pi ($\pi$). The PS is calculated by the said computer-implemented method (see highlighted segment in FIG. 3) and becomes the latest PIV assigned to the user. The user determines the length of the Pi Segment (the number of digits comprising the PS). For example, one user can arrange Pi Segments to be comprised of 10 decimal digits while another user will assign 6 decimal digits to his/her Pi Segments. Accordingly, the term Pi Segment Length (PSL) refers to the number of digits comprising a Pi Segment (PS).

The method also comprises of "Pi User Identifiable Parameters" (PUIPs) which are linked to the user's "Personal Identifiable Information" (PII) and the user's account information (e.g. a user's account with a web-based shoe retailer). The PUIPs includes a Pi Range (PR), a historical PI Segment Data, a Pi Segment Length (PSL), a Pi Starting Segment (PSS), a Pi Change Rate (PCR), a Decimal Repositioning Movement (DRM), and Current Time (CT). The PUIPs are utilized to calculate the PIV. The method can provide an additional security layer by encrypting all the data comprising the PUIPs stored at the user's computing device, networks and websites.

As an example, to start the process of utilizing the method (the invention), the user uploads the software application needed to perform the mathematical operation of Pi into his/her computing device. The user acquires the software application from the website server or network server and utilizes the network or website Current Time (CT) to time-synchronize his/her computing device with said website or network.

After the user uploads the software application, the user selects and uploads a section of Pi into his/her computing device (Pi is stored at the said website server or network server). The array of digits comprising the said section of Pi selected by the user becomes his/her assigned Pi Range. In this example, the user defines his/her Pi Range (PR) as the range that begins with the thirteen decimal digit of Pi. Thus, the numeral "7" in the 3.1412956535897932 array of decimal digits of Pi is the first digit in his/her assigned 100,000 decimal digits Pi Range.

As the next step in the process, the user proceeds to select the Pi Starting Segment (PSS). The PSS refers to a segment of the PR selected by the user as the starting point of reference to calculate the Pi Segment representing the PIV (see highlighted segment in FIG. 2). When the user selects the PSS, the method utilizes the time when the PSS is selected by the user to start (initiate) the clock. Accordingly, the time at the selection of the PSS in combination with the PCR, are used to calculate the first Pi Segment.

To calculate the first PS and all the following Pi Segments, the user sets the PCR value. The PCR (Pi Change Rate) sets the time period that the Decimal Repositioning Movement (DRM) takes to move from one Pi Segment location to another Pi Segment location within the Pi Range. In this example, the user sets the PCR to equal 95 minutes, thus, the PCR instructs the software application to provide the next Pi Segment in 95 minutes. Accordingly, the user acquires a new PIV every 95 minutes (the PIV is the equivalent of the latest calculated Pi Segment (PS)).

Utilizing Current Time (CT) and the first PS clocked time, the next PS is calculated by the user's computing device utilizing the PCR in combination with the prior PS clocked time. Accordingly, all Pi segments are calculated utilizing the clocked time of the expiring PS and the PCR to acquire the next PS. As a result of the constrained time range established by the PCR, all Pi Identification Values (PIVs) are activated for the duration of the PCR (hence, for a limited period of time). Accordingly, after the PCR time period concludes, the current PS is replaced by a new and active PS rendering the prior PS expired.

After uploading the software application and the Pi Range and the programming of the parameters (CT, Pi Range, PSS, PCR and DRM) into the his/her computing device, the user is ready to transmit the said parameters to the website or the network that he/she wants to connect and interface. After the said website or network receives the parameters, the user and the website or the network are ready to utilize the method (the invention).

As an added description to describe the invention in more detail, the following information is provided next. The DRM represents the number of decimal digits between the expired PS and the latest calculated PS. The mathematical operation of the computer-implemented method finds the location of the new PS (within the PR) by moving from the expiring PS location a prearranged number of decimal digits (the DRM). For example, the location of a new PS is calculated by moving away 2,256 decimal digits from the location of the expiring PS. Accordingly, the PS changes values as the method's mathematical operation utilizes the DRM to calculate the latest PIV.

The Current Time (CT) is associated with the User's Computer Device and the administrator's computer server and synchronized from at least one of the following: a timer, a centralized time system, a network time, or a cell phone network system time.

The said computer device is also referred in this patent application as computing device and includes such computer devices as laptops, tablets, iPads, or cellular telephones. The computing device is utilized and operated by the user to acquire PIV. The computer server refers to the computer operated by the administrator to acquire, through the same mathematical operation and PUIPs utilized by the user, the same PIV to authenticate the user during a login process (e.g. user log into a tool web-based retailer). Therefore, the administrator's computer server and the user's computing device are capable to obtain the same result, thus the same PS (or PIV). Further, the user's computing device and the administrator's computer server are all connected to the same network. Therefore, the connection to the network by administrator's computer server provides the administrator with the necessary electronic communication capabilities to authenticate the user's PIN (Personal Identification Number) and authenticate the user during a login process. As an example, the authentication of the PIV is performed when the user's computing device is contacting the administrator's computer server during a login process, where the administrator's server sends PIV information (provided by the user) to the administrator's server for user authentication. Accordingly, the method provides the administrator's computer server with a user-driven synchronized process to verify the user's PIV during a login process. The term user-driven is to denote that the user is selecting the parameters needed to utilize/operate the invention.

Once the abovementioned parameters are established and agreed by the user and administrator, the computer-run mathematical operation (a calculation by mathematical methods) of the mathematical constant Pi ($\pi$) and the PUIPs are utilized to calculate a new segment of Pi, hence the latest PIV assigned to the user.

As part of the invention's method, the user-selected range of the mathematical constant Pi (3.141592 . . . ) is stored in the electronic memory of the user-operated computing device and the database of the Network or Website's computer server. Since Pi is an infinite number, only a range of Pi demarcated by the user is stored by the user into his/her computer device as the Pi Range. The same Pi Range selected (prearranged) by the user is stored in the database managed by the administrator's computer server.

For added security, the method can require the user to select a subset of digits within the arrived Pi Segment to be utilized as the actual user's PIV. The added step provides an additional layer of security to the networks and websites. For example, if the method is programmed to select a 10 digit long segment from the Pi Range to be used as a Pre Pi Segment, and after this step in the authentication process, the method then requires the user to select a prearranged 6-digit subset (e.g. the 3rd to the 8th digit) of the digits comprising the 10 digit Pre Pi Segment to finally expose the user's PIV, then an unauthorized user who does not know which 6 digits to select as the PIV will not be able to log into the secured network or website.

Moreover, if the method's software requires the user to highlight the digits that are not part of the user's PIV and then delete them from the Pre Pi Segment with a particular entry key (e.g. pressing on the letter "H") to delete the 4 digits that are not part of the PIV (the $1^{st}$, $2^{nd}$, $9^{th}$ and $10^{th}$ digits), then this added feature adds another layer of security to the user authentication process of this method. Other security features like adding a set of digits like a PIN (Personal Identification Number) to the PIV can also provide additional security to the users, websites and networks. For example, adding a 4-digit string PIN (e.g. 3753) to a 6-digit string PIV (e.g. 782154) to create a final 10-digit string identification construct, thus a resulting 7821543753 passcode. Or sum (adding) a 4-digit PIN (e.g. 4721) to a 6-digit PIV (e.g. 943875) to create a final 6-digit identification construct, thus a resulting 948596 passcode. These possible options as well as other options (e.g. subtracting, multiplying or dividing PIVs with the use of a PIN) can create millions of combinations to construct a complete and more secure PIV.

The computer-implemented method is operated by an application software (operating in the user's device) to perform the computer-run mathematical operation on the Pi Range to select a segment of Pi. When the user operates the computer-implemented method, the application software, run by the user's computing device, provides the user the latest Pi Segment. The computing device provides the user with the latest PIV through the computer device's screen. The newly acquired PIV is then utilized by the user to complete a login process when interfacing with a website or network to gain access to said network or website. Furthermore, to support the functioning of the network-based PIV authentication process, a computer software is also designed to operate in the administrator's computer server and consequently, to support the computer-implemented method to generate and authenticate the user's PIV.

Token Technology and the Invention. For the reason that the method provides to the user with a different PIV each time he/she logs into each particular website or network, the user's historical PIV data is also utilized as a "PIV Signed Token". The said PIV data is comprised of Pi ID Values (PIVs) generated by the authentication method (this invention) during each login process performed by the user. The said Pi Signed Token (PST) is stored in an encrypted format into the user's computing device, website and network databases to be used as an additional authenticating factor and thus, to add another security layer to this Pi based method (this invention).

Each time the user's computing device is communicating with a network or website utilizing the method (the invention), the server of said network or website receives the Pi Signed Token (PST) as another authenticating factor to further authenticate the user. Each iteration of the authentication process (each accomplished user's login action between the user's computing device and the network or website) updates the PST by adding the latest encrypted PIV and thus, adding new corroborated data to increase the identifying information of the PST. The updated PST is stored in the memory of the user's computer device as well as in the database of the said network or website to be utilized to authenticate the user during his/her next login request. Without a current (up-to-date) PST, a website or a network requiring a user's computing device to provide a current PST to complete the login process will not be able to gain access into the said website or network.

The PST is a contactless token and can be programmed. The PST resides encrypted in the user's memory device as part of the method (the invention). Websites and networks can program the PST to have "Operating Hours" (e.g. 8:00 am to 4:00 pm), "Operating Days" (e.g. Wednesday to Friday), expire at a prearranged PIVs limit (to void efforts of finding a PIV key through "pattern finding"), expire at a prearranged date and/or time, require user to periodically "revalidate" token (e.g. require user to enter a PIN), and utilize a programmed change cryptographic signing scheme where more than one encryption method is employed at different times (e.g. every week, the encryption system used to protect the token is replaced). The PST can also be linked to a particular device (e.g. Remembered Devices Functionality) and/or request a "Signature" during the login process (e.g. user talking into his/her device through voice recognition technology).

The computer-implemented method to calculate and generate a constantly changing identification constructs for network or website users comprises of computing devices comprising of processors, database systems, entry devices, displays, wireless transmission systems, electronic connection capabilities to the World Wide Web and the software to process the mathematical operation of Pi and the users' authentication data stored in the users' computing devices and the network and website administrators' computing devices to calculate the PIV and transmit the said PIV from the users' computing devices to the websites and networks connected to users' computing devices.

The present invention overcomes the limitations of the Two Factor Authentication methods by providing a "Real-Time" passcode generating process and avoiding possible time delays due to disruptions in network connectivity or other communications problems. Thus, the method provides faster login times (the user is no longer required to wait for a text or an email to obtain the passcode), increased level of security flexibility (e.g. user can control the length of the passcode and other PUIDs parameters), and can be used in combination with token technology (e.g. token containing PIV historical data as an added authentication factor).

SEQUENCE LISTING

Not Applicable

I claim:

1. A user-driven computer-implemented user authentication method to provide users of computer information systems with a frequently changing numeric passcode (the method is dynamic) generated via a mathematical operation of the mathematical constant Pi ($\pi$), comprising of:

operating, by a user, a computing device connected to a computer network to log into secured networks and secured websites; wherein the user's computer device and the computer servers running the secured websites and the computer servers running the secured networks are also connected such that the user, the said websites and the said networks are in electronic communication with one another;

installing, by the said user, an application software to the said user computer device, wherein the said software is capable to process the instructions and mathematical calculations to locate segments of Pi which will become the Pi Identification Values (PIVs) to be used to identify the said user;

storing, by the user on the user-operated computing device, the user Personal Identifiable Information (PII), the mathematical constant Pi, and a set of user-created Pi User Identifiable Parameters (PUIPs) into the memory of the user's computing device; wherein the PUIP's are changeable by the user at any time but not by the secured network or the secure website; wherein the PUIPs include at least a Pi Range (PR), a Pi Segment Length (PSL), a Pi Starting Segment (PSS), a Pi Change Rate (PCR), a Decimal Repositioning Movement (DRM), and a Current Time (CT);

uploading from the secured network computer server and/or from the secured website computer server an application software and installing the said application software on the user-operated computing device; wherein the application software is designed to perform a mathematical operation of the mathematical constant Pi, wherein the computing device comprises a user display for viewing a screen illustrating the results of the mathematical operation;

storing, by the user, a user-selected array of digits comprising a segment of Pi to become the user's designated Pi Range into the memory of the user's computing device; registering, by the user, via the computer network connection, a set of user Personal Identifiable Information (PII) and a set of user-created Pi User Identifiable Parameters (PUIPs) into the memory of the website or network computer server;

operating, via the application software on the user-operated computing device, in response to initiating an authentication with the network and/or website, by the user, the said application software, the mathematical operation by utilizing the mathematical constant Pi and the set of user-created PUIPs to select a new segment of Pi each time the user is performing a login process required by a network or website via the user's computing device, wherein the new segment of Pi comprises the user's passcode used to authenticate the user during the user authentication process;

displaying, in response to operating the application software, on the user-operated computing device, a screen which illustrates the user-selected Pi range (PR), the highlighted Pi segment, and the expiration time of the Pi segment representing the user's passcode;

transmitting, by the user's computer device to the said website or network, via the network connection, the calculated PIV;

verifying, by the said website or network computer server, the PIV transmitted by the user's computing device; and authorizing, the user's computing device to gain access to the website or network if the compared PIVs (passcode values) match, but denying access to the user if they do not match.

2. The method of claim 1, comprising of: operating, by a website or computer network, a computing server connected to networks and websites; installing, by the said website or network, an application software to the website's computer server or network's computer server, wherein the said software is capable to process the instructions and mathematical calculations to locate segments of Pi which will become the user's Pi Identification Values (PIVs) to be used to identify the said user during the login process into the said network or website; storing, by the website or network, the user Personal Identifiable Information (PII) and the set of user-created Pi User Identifiable Parameters (PUIPs) into the memory of the website computer server or network computer server; storing, by a website computer server or network computer server, a user-selected array of digits comprising a segment of Pi to become the user's designated Pi Range; registering, via a network connection, a user's set of user Personal Identifiable Information (PII) and a set of user-created Pi User Identifiable Parameters (PUIPs) into the memory of the website or network computer server; operating, by a website computer server or a network computer server and the said application software, the mathematical operation of the mathematical constant Pi and the set of user-created PUIPs to acquire a new segment of Pi each time the user is performing a login process required by the said network or website; authorizing, by the website computer server or network computer server, the user's computing device request to gain access to the website or network, via the network connection, after the said network computer server or website computer server verifies the user's submitted PIV; interacting, the website computer server or network computer server with the user's computing device.

3. The method of claim 1, wherein the stored set of user-created Pi User Identifiable Parameters (PUIPs) further comprises of: a Pi Range (PR); a Pi Starting Segment (PSS); a Pi Change Rate (PCR); a Decimal Repositioning Movement (DRM); a historical Pi Segment Data; a Pi Segment Length (PSL); and Current Time (CT).

4. The method of claim 1, wherein the mathematical operation further comprises of: performing the mathematical operation of the mathematical constant Pi and the set of user-created PUIPs each time the user initiates the application software to acquire a new PIV to complete a login process.

5. The method of claim 1, wherein to attain the same Pi segment, the website computer server or network computer server utilizes the same Pi User Identifiable Parameters (PUIPs) and mathematical operation that the user-operated computing device utilizes to select the Pi Segment, synchronizing the process for both, user and website or computer network, to continuously attain the same PIV to authenticate the user of the computing device requesting authentication.

6. The method of claim 1, wherein the application software is executed by the user's computing device to operate the instructions and mathematical operation of the mathematical constant Pi to obtain a new Pi Segment to be used as the latest PIV assigned to the user.

7. The method of claim 1, wherein the mathematical operation of the mathematical constant Pi utilizes a Pi Change Rate (PCR), a Decimal Repositioning Movement (DRM), a Pi Segment Length (PSL), a Pi Range (PR), Pi Starting Segment (PSS) and Current Time (CT) to obtain a new segment of Pi to represent the latest PIV assigned to the user.

8. The method of claim 1, wherein the method requires the user to select a subset of digits within the mathematically acquired Pi Segment to be utilized as the actual user's PIV.

9. The method of claim 1, further comprising of computing devices comprising of processors, database systems, entry devices, displays, wireless transmission systems, electronic connection capabilities to the World Wide Web and the software to process the mathematical operation of the mathematical constant Pi and the users' authentication data stored in the users' computing devices and the network and website computing servers to calculated the Pi Segment and transmit the said PI Segment (also known as PIV) from the users' computing devices to the websites and networks connected to users' computing devices for which the user is attempting to login.

10. A user-driven computer-implemented user authentication method to provide users of computerized devices with a frequently changing numeric passcode (the method is dynamic) generated via a mathematical operation of the mathematical constant Pi ($\pi$), comprising of:

operating, by a user, a computing device connected to a computer network to log into secured networks and secured websites; wherein the user's computer device and the computer servers running the secured websites and the computer servers running the secured networks are also connected such that the user, the said websites and the said networks are in electronic communication with one another;

installing, by the said user, an application software to the said user computer device, wherein the said software is capable to process the instructions and mathematical calculations to locate segments of Pi which will become the Pi Identification Values (PIVs) to be used to identify the said user;

storing, by the user on the user-operated computing device, the user Personal Identifiable Information (PII), the mathematical constant Pi, and a set of user-created Pi User Identifiable Parameters (PUIPs) into the memory of the user's computing device; wherein the PUIP's are changeable by the user at any time but not by the secured network or the secure website; wherein the PUIPs include at least a Pi Range (PR), a Pi Segment Length (PSL), a Pi Starting Segment (PSS), a Pi Change Rate (PCR), a Decimal Repositioning Movement (DRM), and a Current Time (CT);

uploading from the secured network computer server and/or from the secured website computer server an application software and installing the said application software on the user-operated computing device; wherein the application software is designed to perform a mathematical operation of the mathematical constant Pi, wherein the computing device comprises a user display for viewing a screen illustrating the results of the mathematical operation;

storing, by the user, a user-selected array of digits comprising a segment of Pi to become the user's designated Pi Range into the memory of the user's computing device; registering, by the user, via the computer network connection, a set of user Personal Identifiable Information (PII) and a set of user-created Pi User Identifiable Parameters (PUIPs) into the memory of the website or network computer server;

operating, via the application software on the user-operated computing device, in response to initiating an authentication with the network and/or website, by the user, the said application software, the mathematical operation by utilizing the mathematical constant Pi and the set of user-created PUIPs to select a new segment of Pi each time the user is performing a login process required by a network or website via the user's computing device, wherein the new segment of Pi comprises the user's passcode used to authenticate the user during the user authentication process;

displaying, in response to operating the application software, on the user-operated computing device, a screen which illustrates the user-selected Pi range (PR), the highlighted Pi segment, and the expiration time of the Pi segment representing the user's passcode;

transmitting, by the user's computer device to the said website or network, via the network connection, the calculated PIV;

verifying, by the said website or network computer server, the PIV transmitted by the user's computing device; and authorizing, the user's computing device to gain access to the website or network if the compared PIVs (passcode values) match, but denying access to the user if they do not match.

11. The method of claim 10, comprising of: operating, by a website or computer network, a computing server connected to networks and websites; installing, by the said website or network, an application software to the website's computer server or network's computer server, wherein the said software is capable to process the instructions and mathematical calculations to locate segments of Pi which will become the user's Pi Identification Values (PIVs) to be used to identify the said user during the login process into the said network or website; storing, by the website or network, the user Personal Identifiable Information (PII) and the set of user-created Pi User Identifiable Parameters (PUIPs) into the memory of the website computer server or network computer server; storing, by a website computer server or network computer server, a user-selected array of digits comprising a segment of Pi to become the user's designated Pi Range; registering, via a network connection, a user's set of user Personal Identifiable Information (PII) and a set of user-created Pi User Identifiable Parameters (PUIPs) into the memory of the website or network computer server; operating, by a website computer server or a network computer server and the said application software, the mathematical operation of the mathematical constant Pi and the set of user-created PUIPs to acquire a new segment of Pi each time the user is performing a login process required by the said network or website; authorizing, by the website computer server or network computer server, the user's computing device request to gain access to the website or network, via the network connection, after the said network computer server or website computer server verifies the user's submitted PIV; interacting, the website computer server or network computer server with the user's computing device and the computer device receiving the instructions from the user's computing device.

12. The method of claim 10, wherein the stored set of user-created Pi User Identifiable Parameters (PUIPs) further comprises of: a Pi Range (PR); a Pi Starting Segment (PSS); a Pi Change Rate (PCR); a Decimal Repositioning Movement (DRM); a historical Pi Segment Data; a Pi Segment Length (PSL); and Current Time (CT).

13. The method of claim 10, wherein the mathematical operation further comprises of: performing the mathematical operation of the mathematical constant Pi and the set of user-created PUIPs each time the user initiates the application software to acquire a new PIV to complete a login process.

14. The method of claim 10, wherein to attain the same Pi segment, the website computer server or network computer server utilizes the same Pi User Identifiable Parameters (PUIPs) and mathematical operation that the user-operated computing device utilizes to select the Pi Segment, synchronizing the process for both, user and website or network, to continuously attain the same PIV to authenticate the user of the computing device requesting authentication.

15. The method of claim 10, wherein the application software is executed by the user's computing device to operate the instructions and mathematical operation of the mathematical constant Pi to obtain a new Pi Segment to be used as the latest PIV assigned to the user.

16. The method of claim 10, wherein the mathematical operation of the mathematical constant Pi utilizes a Pi Change Rate (PCR), a Decimal Repositioning Movement (DRM), a Pi Segment Length (PSL), a Pi Range (PR), Pi Starting Segment (PSS) and Current Time (CT) to obtain a new segment of Pi to represent the latest PIV assigned to the user.

17. The method of claim 10, wherein the method requires the user to select a subset of digits within the mathematically acquired Pi Segment to be utilized as the actual user's PIV.

18. The method of claim 10, further comprising of computing devices comprising of processors, database systems, entry devices, displays, wireless transmission systems, electronic connection capabilities to the World Wide Web and the software to process the mathematical operation of the mathematical constant Pi and the users' authentication data stored in the users' computing devices and the network and website computing servers to calculated the Pi Segment and transmit the said PI Segment (also known as PIV) from the users' computing devices to the websites and networks connected to users' computing devices for which the user is attempting to login.

19. A user-driven computer-implemented user authentication method to provide users of computer information systems with an encrypted Signed Token based on a frequently changing numeric passcode data generated via a mathematical operation of the mathematical constant Pi ($\pi$) during each user-initiated user authentication process, comprising of:

uploading, into a user' computing device, into computer networks and into websites, a contactless computer programmable signed token system and a software, to be operated by users of computing devices, computer networks and websites to store and utilize the totality of prior Pi Identification Values (PIVs) historical data to authenticate the said users;

operating, by a user, a computing device connected to a computer network to login into networks and websites;

uploading from a network computer server and/or from a website computer server an application software and installing the said application software on the user-operated computing device; wherein the application software is designed to perform a mathematical operation of the mathematical constant Pi to locate segments of Pi which will become the Pi Identification Values (PIVs) to be used to identify the said user, wherein the computing device comprises a user display for viewing a screen illustrating the results of the mathematical operation, and wherein the said software is capable to process, within the user's computing device, the instructions to encrypt the Pi Signed Token (PST), record the prior PIVs data into the PST, retrieve the PIVs data from the PST, and transmit the encrypted PST to the said website and network;

storing, by the user on the user-operated computing device, the user Personal Identifiable Information (PII), and the mathematical constant Pi, and a set of user-created Pi User Identifiable Parameters (PUIPs) into the memory of the user's computing device; wherein the PUIP's are changeable by the user at any time but not by the secured network or the secure website; wherein the PUIPs include at least a Pi Range (PR), a Pi Segment Length (PSL), a Pi Starting Segment (PSS), a Pi Change Rate (PCR), a Decimal Repositioning Movement (DRM), a Current Time (CT), and the prior Pi ID Values (PIVs) data acquired during each login process performed by the user into the PST;

storing, a Pi Signed Token (PST) in an encrypted format into the user' computing device, website and computer network; registering, by the user, via the computer network connection, a set of user Personal Identifiable Information (PII) and a set of user-created Pi User Identifiable Parameters (PUIPs) into the memory of the website or network computer server; operating, by the user, via the user's computing device and the said application software, the mathematical operation of the mathematical constant Pi and the set of user-created PUIPs to acquire a new segment of Pi each time the user is performing a login process required by a network or website;

transmitting, by the user's computer device to the said website or network, via the network connection, the calculated PIV and Signed Token;

verifying, by the said website or network computer server, the PIV and Signed Token transmitted by the user's computing device;

authorizing, the user's computing device to gain access to the website or network;

requiring, the user' computing device, the computer networks and websites, the user to periodically revalidate the PST through the entering of his/her Personal Identifiable Number (PIN);

updating, the PST utilizing the latest generated PIV, wherein the said latest generated PIV is added to the prior PIVs data; and utilizing, a programmed change cryptographic signing scheme for the PST where more than one encryption method is employed at different times.

20. The method of claim 19, comprising of: operating, by a website or computer network, a computing server connected to networks and websites; installing, into a network computer server and website computer server, a contactless computer programmable signed token system, software encoded, to be operated by users of computing devices, computer networks and websites to store and utilize the totality of prior Pi Identification Values (PIVs) data to authenticate the said users; installing, by the said website or network, an application software to the website's computer server or network's computer server, wherein the said software is capable to process the instructions and mathematical calculations to locate segments of Pi which will become the user's Pi Identification Values (PIVs) to be used to identify the said user during the login process into the said network or website; installing, by the said website or network, an application software to the website computer server or network computer server, wherein the said software is capable to process the instructions to encrypt the Pi Signed Token (PST), record the prior PIVs data into the PST, retrieve the PIVs data from the PST, and transmit the encrypted PST to the said user's computing device; storing, by the website or network, the user Personal Identifiable Information (PII) and the set of user-created Pi User Identifiable Parameters (PUIPs) into the memory of the website computer server or network computer server; storing, by a website computer server or network computer server, a user-selected array of digits comprising a segment of Pi to become the user's designated Pi Range; registering, via a network connection, a user's set of user Personal Identifiable Information (PII) and a set of user-created Pi User Identifiable Parameters (PUIPs) into the memory of the website or network computer server; operating, by a website computer server or a network computer server and the said application software, the mathematical operation of the mathematical constant Pi and the set of user-created PUIPs to acquire a new segment of Pi each time the user is performing a login process required by the said network or website; authorizing, by the website computer server or network computer server, the user's computing device request to gain access to the website or network, via the network connection, after the said network computer server or website computer server verifies the user's submitted PIV and the encrypted Signed Token; interacting, the website computer server or network computer server with the user's computing device.

21. The method of claim 19, wherein the stored set of user-created Pi User Identifiable Parameters (PUIPs) further comprises of: a Pi Range (PR); a Pi Starting Segment (PSS); a Pi Change Rate (PCR); a Decimal Repositioning Movement (DRM); a historical Pi Segment Data; a Pi Segment Length (PSL); and Current Time (CT).

22. The method of claim 19, wherein the mathematical operation further comprises of: performing the mathematical operation of the mathematical constant Pi and the set of user-created PUIPs each time the user initiates the application software to acquire a new PIV to complete a login process.

23. The method of claim 19, wherein to attain the same Pi segment, the website computer server or network computer server utilizes the same Pi User Identifiable Parameters (PUIPs) and mathematical operation that the user-operated computing device utilizes to select the Pi Segment, synchronizing the process for both, user and website or computer network, to continuously attain the same PIV and an updated encrypted Signed Token to authenticate the user of the computing device requesting user authentication.

24. The method of claim 19, wherein the application software is executed by the user's computing device, website computer server or network computer server to operate the instructions and mathematical operation of the mathematical constant Pi to obtain a new Pi Segment and an updated encrypted Signed Token to be used as the latest PIV assigned to the user.

25. The method of claim 19, wherein the mathematical operation of the mathematical constant Pi utilizes a Pi Change Rate (PCR), a Decimal Repositioning Movement (DRM), a Pi Segment Length (PSL), a Pi Range (PR), Pi Starting Segment (PSS) and Current Time (CT) to obtain a new segment of Pi to represent the latest PIV assigned to the user.

26. The method of claim 19, wherein the method requires the user to select a subset of digits within the mathematically acquired Pi Segment to be utilized as the actual user's PIV.

27. The method of claim 19, further comprising of computing devices comprising of processors, database systems, entry devices, displays, wireless transmission systems, electronic connection capabilities to the World Wide Web and the software to process the mathematical operation of the mathematical constant Pi and the user's authentication data stored in the user's computing device and the network and website computing servers to calculated the Pi Segment and transmit the said PI Segment (also known as PIV) and the updated encrypted Signed Token from the user's computing devices to the website and network connected to user's computing device for which the user is attempting to login.

* * * * *